United States Patent
Farmer, II (10) Patent No.: US 12,064,024 B2
(45) Date of Patent: Aug. 20, 2024

(54) HARNESS ASSEMBLY AND METHOD OF USING THE HARNESS ASSEMBLY FOR CARRYING A TREE STAND AND OTHER EQUIPMENT FOR HUNTING

(71) Applicant: Don R. Farmer, II, White Lake, MI (US)

(72) Inventor: Don R. Farmer, II, White Lake, MI (US)

( * ) Notice: Subject to any disclaimer, the term of this patent is extended or adjusted under 35 U.S.C. 154(b) by 0 days.

(21) Appl. No.: 17/348,762

(22) Filed: Jun. 16, 2021

(65) Prior Publication Data

US 2021/0386181 A1 Dec. 16, 2021

Related U.S. Application Data

(60) Provisional application No. 63/039,091, filed on Jun. 15, 2020.

(51) Int. Cl.
| | |
|---|---|
| A45F 3/14 | (2006.01) |
| A45F 3/00 | (2006.01) |
| A45F 3/04 | (2006.01) |
| A45F 3/08 | (2006.01) |

(52) U.S. Cl.
CPC ............. *A45F 3/14* (2013.01); *A45F 3/08* (2013.01); *A45F 2003/045* (2013.01); *A45F 2003/146* (2013.01)

(58) Field of Classification Search
CPC ...................................... A45F 3/14; A45F 3/08
USPC ................................................ 224/153, 627
See application file for complete search history.

(56) References Cited

U.S. PATENT DOCUMENTS

| | | | | |
|---|---|---|---|---|
| 2,141,041 | A * | 12/1938 | Knight .................. | B64D 17/30 244/151 R |
| 3,004,519 | A * | 10/1961 | Weissman ............ | A47D 15/006 182/4 |
| 3,065,821 | A * | 11/1962 | Hundley, Jr. ......... | A01M 31/02 182/187 |
| 3,856,111 | A * | 12/1974 | Baker .................... | A63B 27/00 182/135 |
| 4,327,852 | A * | 5/1982 | Gibson .................. | A45F 3/14 D3/216 |
| 4,475,627 | A * | 10/1984 | Eastridge .............. | A01M 31/02 182/187 |
| 4,582,165 | A * | 4/1986 | Latini ................... | A01M 31/02 182/20 |

(Continued)

*Primary Examiner* — Nathan J Newhouse
*Assistant Examiner* — Lester L Vanterpool
(74) *Attorney, Agent, or Firm* — Technology Law, PLLC (57) ABSTRACT

A harness assembly for carrying a hunting tree stand includes a first upper strap having a first end portion, a second end portion, and an intermediate portion disposed between the first and second end portions: A second upper strap includes a first end portion, a second end portion, and an intermediate portion disposed therebetween. An upper strap buckle is coupled to the first end portion of the first upper strap and the first end portion of the second upper strap. A bridging strap includes a first end portion and a second end portion. The first end portion is coupled to the intermediate portion and is also coupled to the intermediate portion, such that an adjustable loop is formed by the bridging strap, the first end portion of the first upper strap, the upper strap buckle, and the first end portion of the second upper strap.

4 Claims, 14 Drawing Sheets

(56) References Cited

U.S. PATENT DOCUMENTS

| | | | | |
|---|---|---|---|---|
| 4,802,552 | A * | 2/1989 | Williams | A45F 3/26 |
| | | | | 182/187 |
| 5,961,014 | A * | 10/1999 | Knerr | A45F 3/04 |
| | | | | 224/259 |
| 6,135,334 | A * | 10/2000 | Seichter | A45F 3/08 |
| | | | | 224/630 |
| 6,199,731 | B1 * | 3/2001 | Lehoux | A45F 3/14 |
| | | | | 224/259 |
| 6,315,177 | B1 * | 11/2001 | Weatherall | A45F 4/02 |
| | | | | 224/259 |
| D490,938 | S * | 6/2004 | Wydner | D29/101.1 |
| 8,418,899 | B1 * | 4/2013 | Stamps | A45F 3/14 |
| | | | | 224/262 |
| 8,708,284 | B2 * | 4/2014 | Gummeson | B64D 17/30 |
| | | | | 244/151 R |
| 9,642,444 | B2 * | 5/2017 | Krol | A45F 5/021 |
| 2003/0042076 | A1 * | 3/2003 | Ulrich | A01M 31/02 |
| | | | | 182/136 |
| 2009/0294500 | A1 * | 12/2009 | Brown | A45F 3/04 |
| | | | | 224/259 |
| 2011/0259934 | A1 * | 10/2011 | O'Ryan | A45F 3/10 |
| | | | | 224/627 |
| 2012/0061180 | A1 * | 3/2012 | Phillips | A01M 31/02 |
| | | | | 182/129 |
| 2014/0361055 | A1 * | 12/2014 | Myers | A45F 3/04 |
| | | | | 224/160 |

* cited by examiner

HARNESS ASSEMBLY AND METHOD OF USING THE HARNESS ASSEMBLY FOR CARRYING A TREE STAND AND OTHER EQUIPMENT FOR HUNTING

CROSS REFERENCE TO RELATED APPLICATIONS

The subject patent application claims priority to and all the advantages of U.S. Provisional Patent Application No. 63/039,091, filed on Jun. 15, 2020, the contents of which are incorporated herein by reference in their entirety.

INTRODUCTION

The present disclosure relates to a harness assembly and method of using the harness assembly for carrying a hunting tree stand and other equipment for hunting.

BACKGROUND

When hunters prepare to hunt via a tree stand, they often carry the tree stand, climbing sticks to aid with climbing the tree stand, and other equipment to be used while hunting.

SUMMARY

A harness assembly for carrying a hunting tree stand in accordance with an exemplary embodiment is provided. The harness assembly includes a first upper strap having a first end portion, a second end portion, and an intermediate portion disposed between the first and second end portions thereof. The harness assembly further includes a second upper strap having a first end portion, a second end portion, and an intermediate portion disposed between the first and second end portions thereof. The harness assembly further includes an upper strap buckle being coupled to the first end portion of the first upper strap and the first end portion of the second upper strap. The harness assembly further includes a bridging strap having a first end portion and a second end portion. The first end portion of the bridging strap is coupled to the intermediate portion of the first upper strap and is further coupled to the intermediate portion of the second upper strap such that an adjustable loop is formed by the bridging strap, the first end portion of the first upper strap, the upper strap buckle, and the first end portion of the second upper strap. The harness assembly further includes a first lower strap buckle that is coupled to the second end portion of the first upper strap. The harness assembly further includes a first lower strap having a first end portion and a second end portion.

The first end portion of the first lower strap is coupled to the first lower strap buckle. The harness assembly further includes a second lower strap buckle that is coupled to the second end portion of the second upper strap. The harness assembly further includes a second lower strap having a first end portion and a second end portion. The first end portion of the second lower strap is coupled to the second lower strap buckle.

A method for carrying a hunting tree stand in accordance with another exemplary embodiment is provided. The method includes providing a harnesses assembly having first and second upper straps, a bridging strap, first and second upper strap buckles, first and second lower straps, and first and second lower strap buckles. The first upper strap has a first end portion, a second end portion, and an intermediate portion disposed between the first and second end portions thereof. This, second upper strap has a first end portion, a second end portion, and an intermediate portion disposed between the first and second end portions thereof. The upper strap buckle is coupled to the first end portion of the first upper strap and the first end portion of the second upper strap. The bridging strap has a first end portion and a second end portion. The first end portion of the bridging strap is coupled to the intermediate portion of the first upper strap and further coupled to the intermediate portion of the second upper strap such that an adjustable loop is formed by the bridging strap, the first end portion of the first upper strap, the upper strap buckle, and the first end portion of the second upper strap.

The first lower strap buckle is coupled to the second end portion of the first upper strap. The first lower strap has a first end portion and a second end portion. The first end portion of the first lower strap is coupled to the first lower strap buckle. The second lower strap buckle is coupled to the second end portion of the second upper strap. The second lower strap has a first end portion and a second end portion. The first end portion of the second lower strap is coupled to the second lower strap buckle. The method further includes coupling the adjustable loop to both a top portion of the hunling platform and to at least one ladder section of the hunting tree stand that is disposed against the hunting platform such that the at least one ladder section is firmly held against a back side of the hunting platform. The method further includes coupling the second end portion of the first lower strap to a bottom portion of the hunting platform. The method further includes coupling the second end portion of the second lower strap to the bottom portion of the hunting platform. The method further includes disposing the first and second upper straps against a chest of a user, such as a hunter, while the first and• second upper straps extend over first and second shoulders, respectively, of the user and the first and second lower straps are disposed proximate to first and second gluteus medius muscle regions, respectively, of the user such that a front side of the hunting tree stand is disposed against a back of the user and the user carries the looting tree stand using the harness assembly.

BRIEF DESCRIPTION OF THE DRAWINGS

Advantages of the present disclosure will be readily appreciated as the same becomes better understood by reference to the following detailed description when considered in connection with the accompanying drawings wherein.

DETAILED DESCRIPTION

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, down, upper, lower, upward and downward may be used with respect to the drawings. These and similar directional terms are not to be construed to limit the scope of the disclosure in any manner. Additionally, the disclosure, as illustrated and described herein, may be practiced in the absence of any element that is not specifically disclosed herein.

The components of the disclosed embodiments, as described and illustrated herein, may be arranged and designed in a variety of different configurations. Thus, the following detailed description is not intended to limit the scope of the disclosure, as claimed, but is merely representative of possible embodiments thereof. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure. Furthermore, the drawings are in simplified form and are not to precise scale. For purposes of convenience and clarity only, directional terms such as top, bottom, left, right, up, down, upper, lower, upward and downward may be used with respect to the drawings. These and similar directional terms are not to be construed to limit the scope of the disclosure in any manner. Additionally, the disclosure, as illustrated and described herein, may be practiced in the absence of any element that is not specifically disclosed herein.

Figure 1:
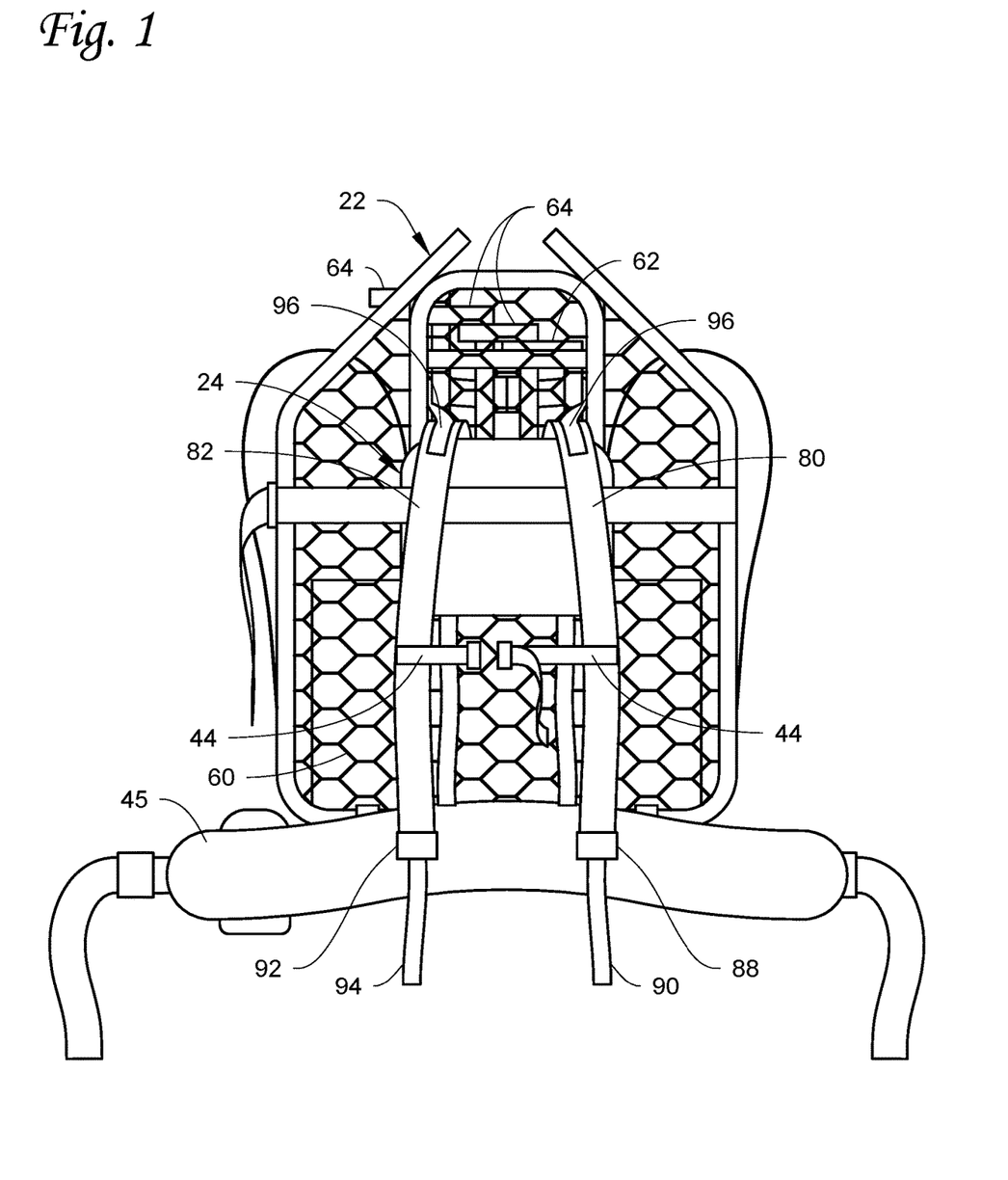
FIG. 1 is a front view of a user, i.e., hunter, carrying a hunting tree stand utilizing a harness assembly in accordance with an exemplary embodiment.
Figure 2:
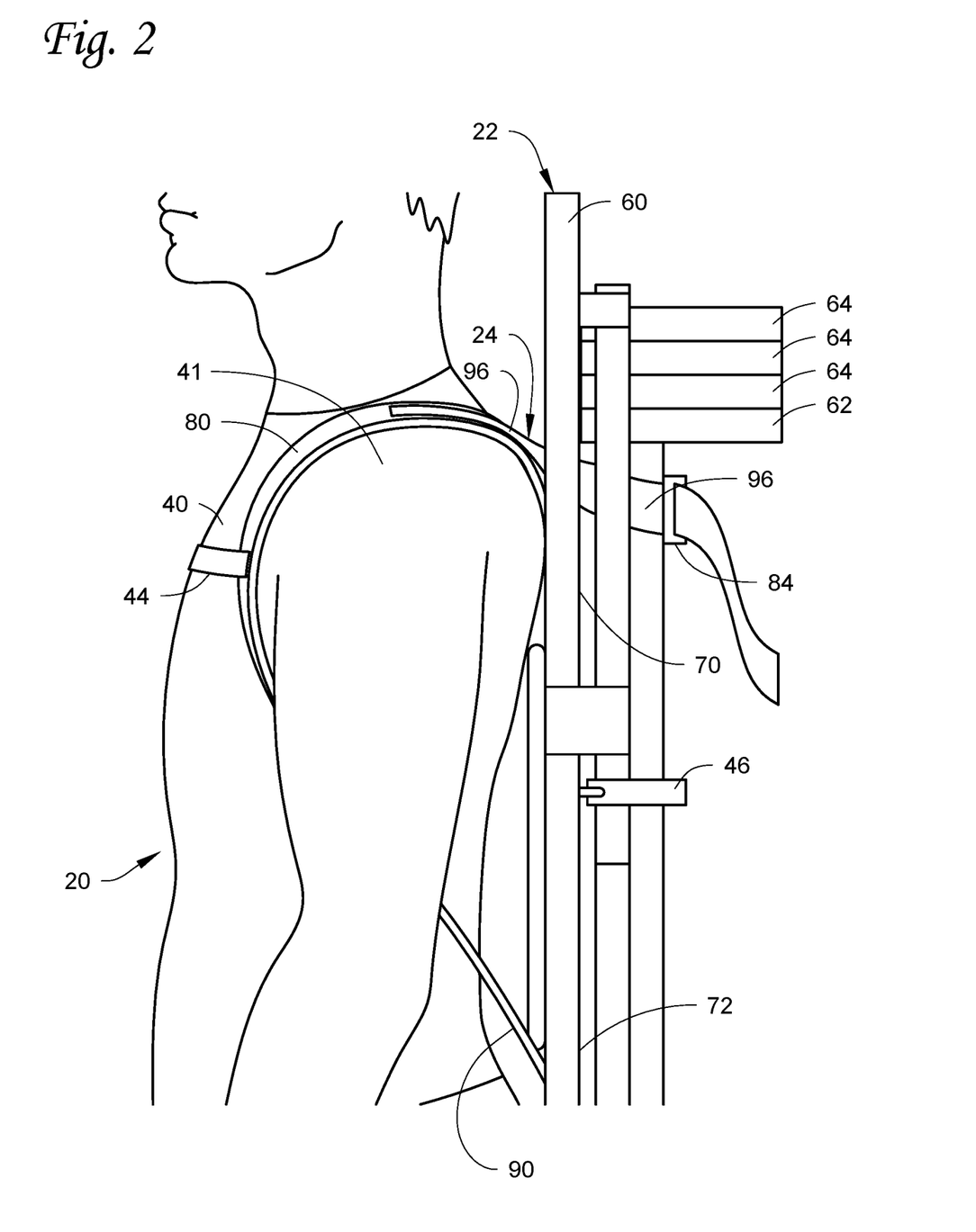
FIG. 2 is a side view of the user carrying the hunting tree stand utilizing the harness assembly of FIG. 1.
Figure 3:
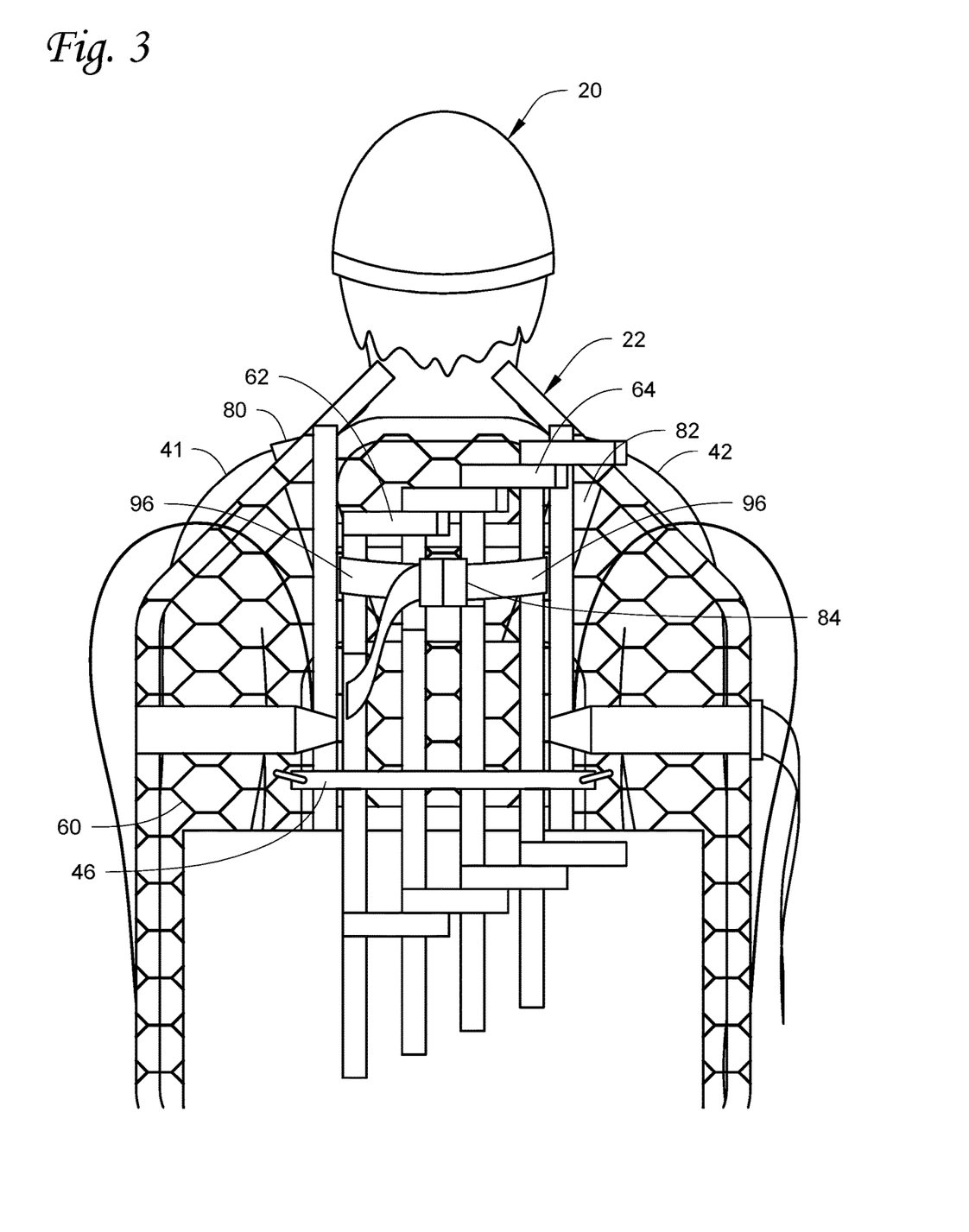
FIG. 3 is a rear view of the user carrying the hunting tree stand utilizing the harness assembly of FIG. 1.
Figure 5:
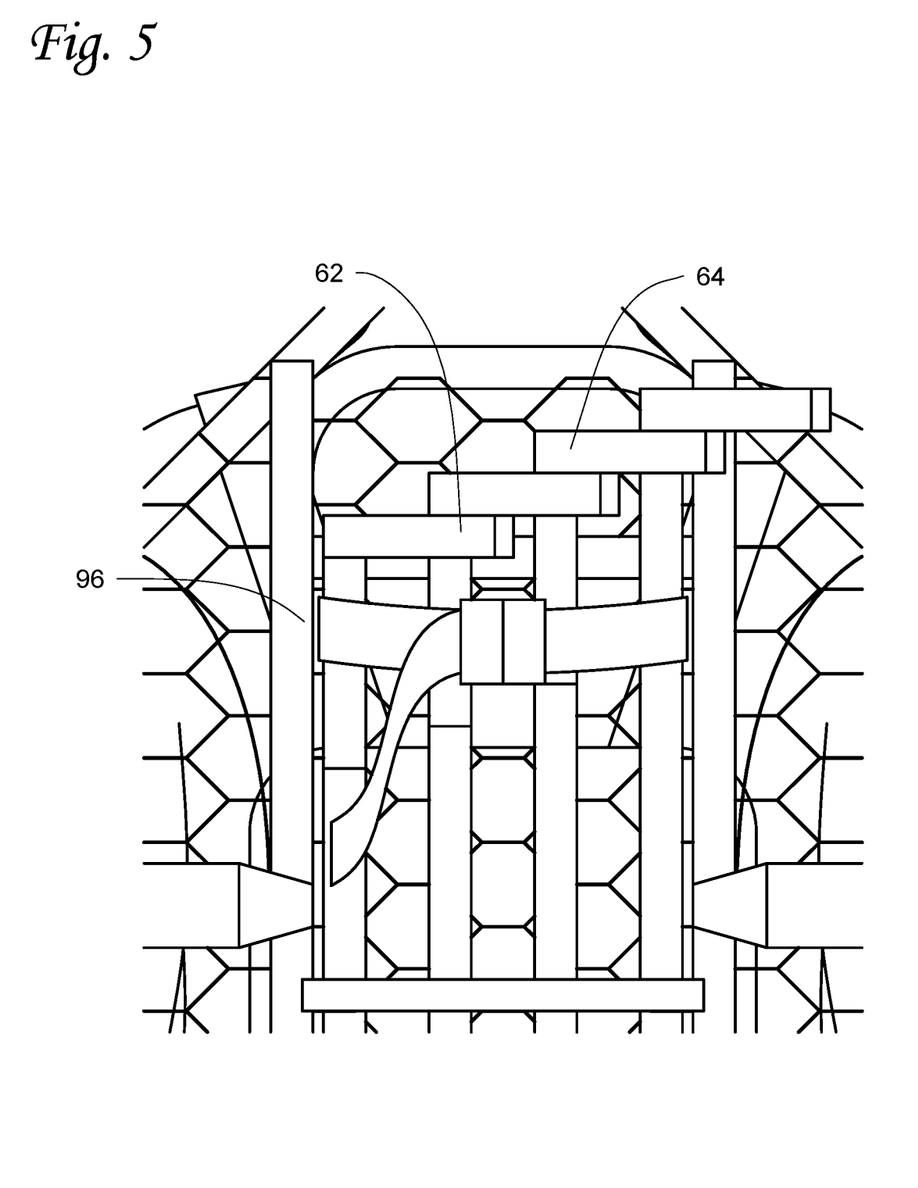
FIG. 5 is a front view of the hunting tree stand having the harness assembly of FIG. 1 coupled thereto.
Figure 6:
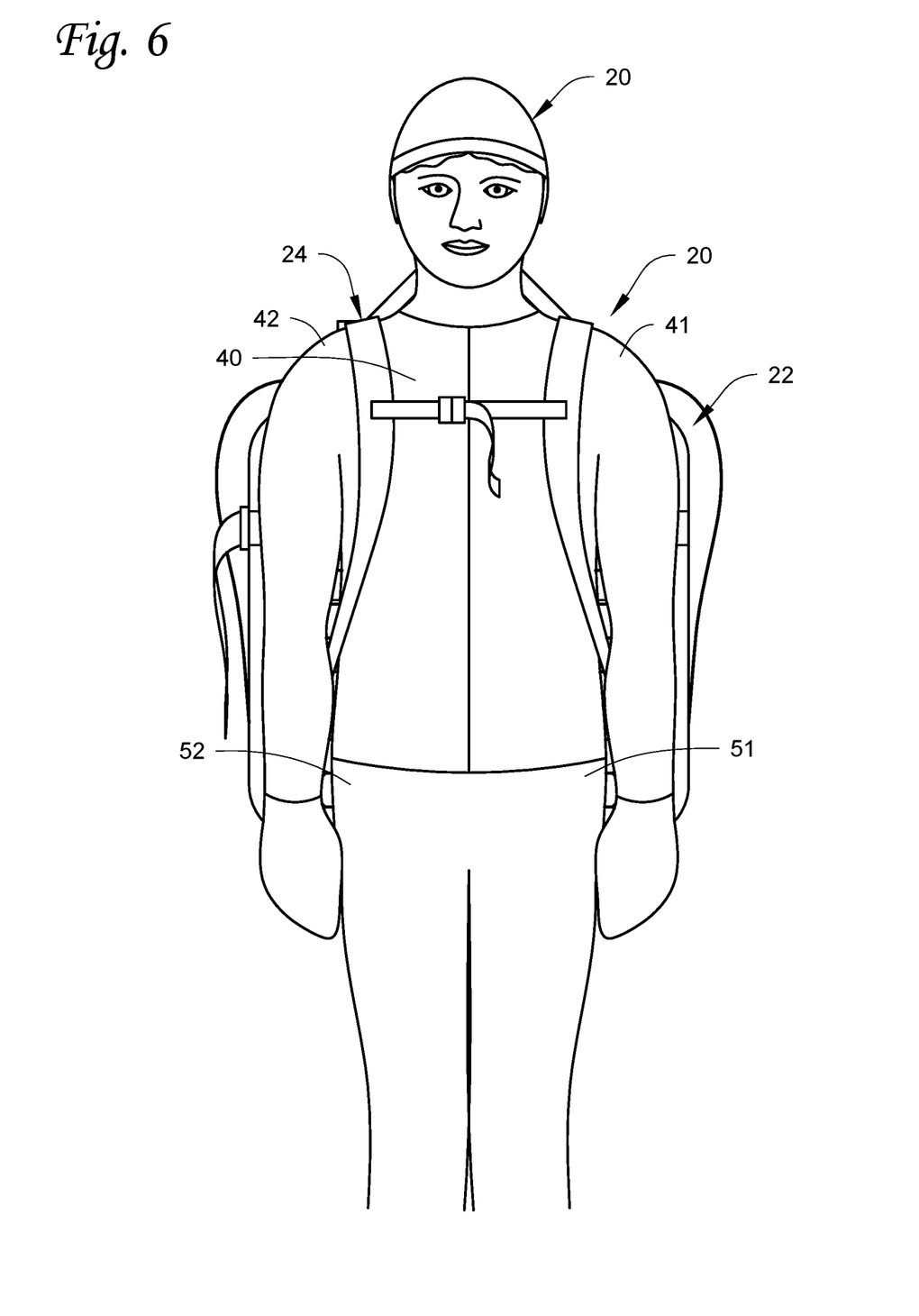
FIG. 6 is a rear view of the hunting tree stand and the harness assembly of FIG. 5.
Figure 7:
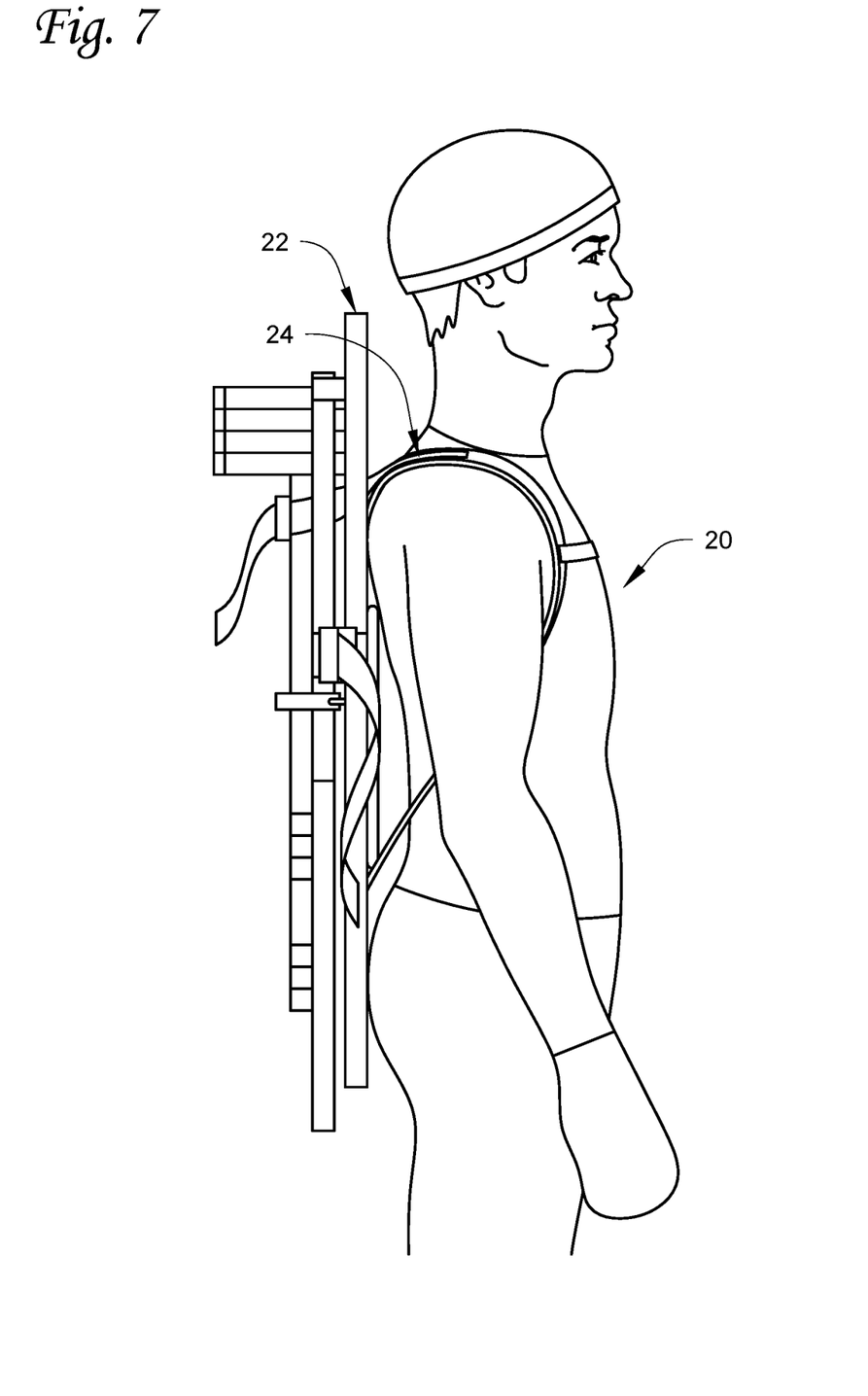
FIG. 7 is an enlarged front view of an upper portion of the hunting tree stand and the harness assembly of FIG. 5.
Figure 8A:
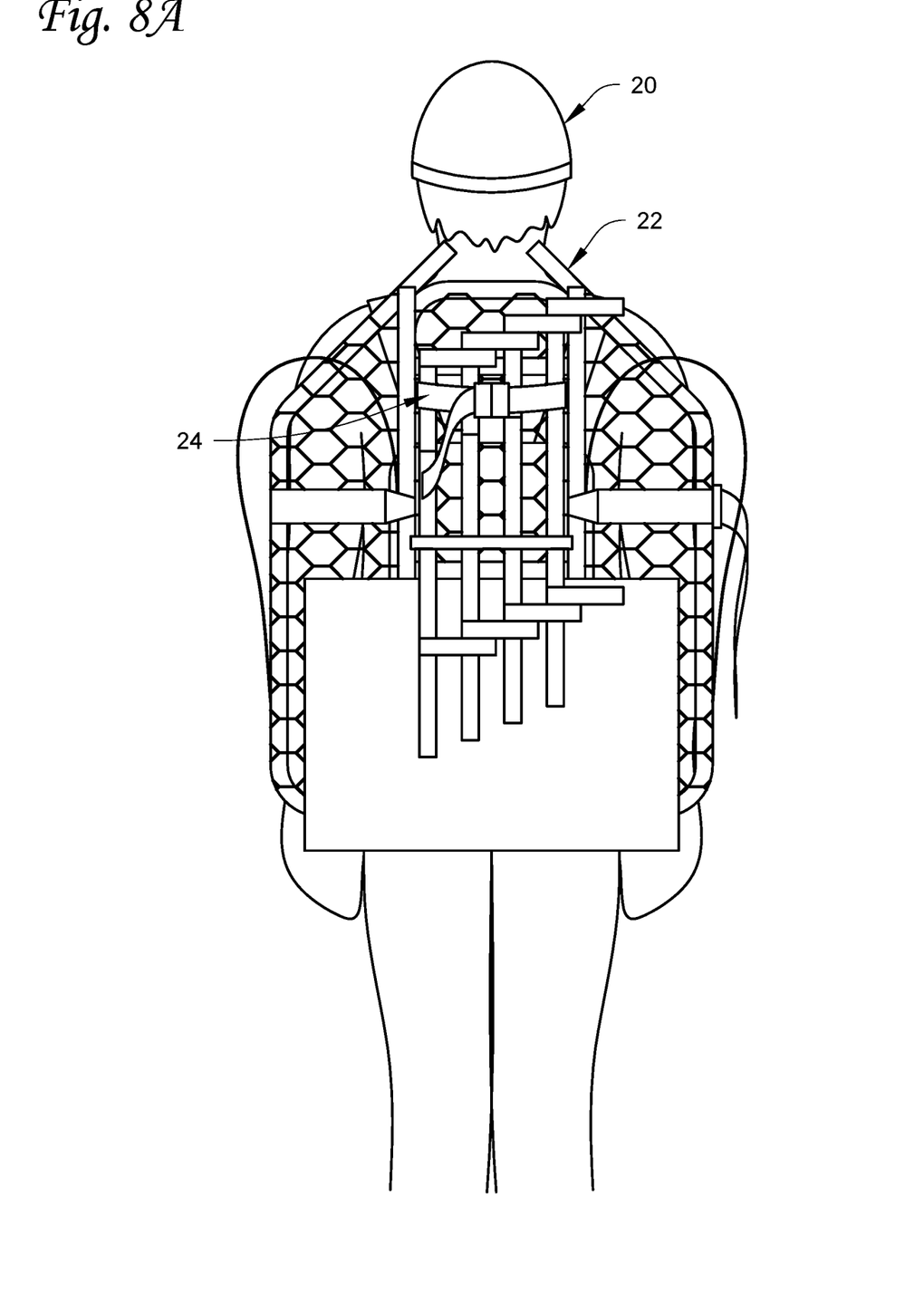
FIGS. 8A and 8B are another rear view of the user carrying the hunting tree stand utilizing the harness assembly.
Figure 8B:
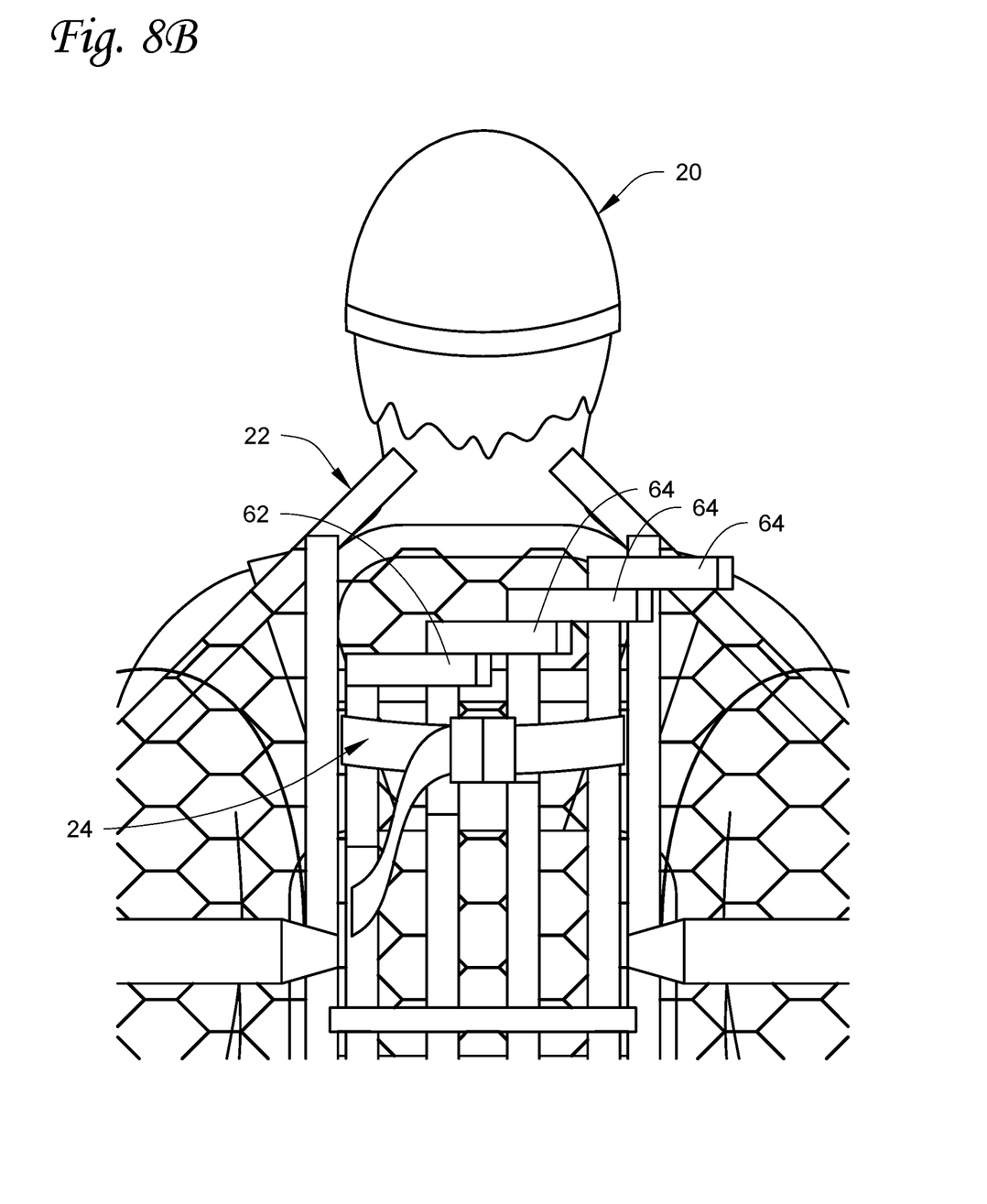

Referring to FIGS. 1, 3, and 5, a user 20, hereinafter referred to as a hunter 20, is illustrated as using a harness assembly 24 to carry a hunting tree stand 22 and other equipment used for hunting. The harness assembly 24 is worn and secured to the hunter 20 across the chest, using a chest strap 44, and around the waist, using a waist belt 45. The hunter 20 utilizes the harness assembly 24 to carry the hunting tree stand 22, as will be explained in greater detail below. The harness assembly 24 is operatively supported by the hunter's 20 first and second shoulders 42, and first and second gluteus medius muscle regions 51, 52. The harness assembly 24 may be secured across the chest 40 to provide further support.

Figure 4:
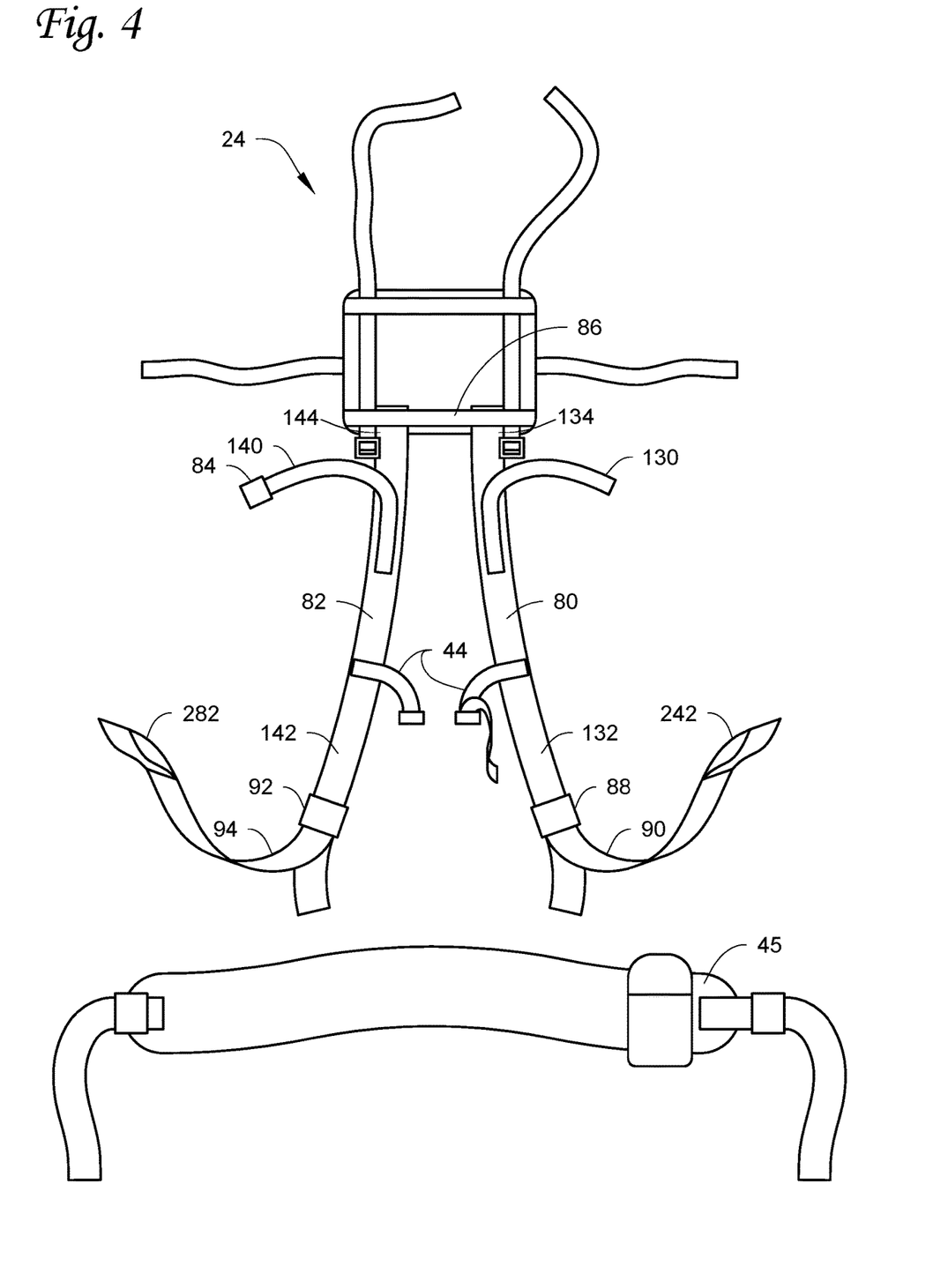
FIG. 4 is an enlarged rear view of the user, the hunting tree stand, and the harness assembly of FIG. 3.

With reference to FIGS. 4-5, the harness assembly 24 includes a bridging strap 86 configured to form a retention loop 96 that holds hunting equipment, such as climbing sticks 62, 64, or ladder sections, and the like. As shown in the figures, when the hunter 20 is carrying the tree stand 22 and the climbing sticks 62, 64, the retention loop 96 pulls the climbing sticks 62, 64 securely against the tree stand 22. With continuing reference to FIG. 3, opposing ends of a secondary cord may be secured to the tree stand 22, in spaced relationship to the retention loop 96. The secondary cord 46, such as a bungee cord and the like, may be operatively attached to a platform 60 of the tree stand 22 to further secure the climbing sticks 62, 64 against the platform 60. Securing the climbing sticks 62, 64 against the platform 60 prevents unwanted noises that may disturb game, such as deer, as the hunter 20 walks to and/or from a hunting location. In one nonlimiting embodiment, at least a portion of the secondary cord 46 is formed from an elastic material or as an elastic construction, configured to absorb vibrations and the impact from walking. The secondary cord 46 may have clips at opposing ends thereof, configured to be removably attached to the platform 60.

Referring to FIGS. 5-9, the hunting tree stand 22 includes the hunting platform 60 and climbing sticks 62, 64. The hunting platform 60 may include multiple components, including, but not limited to a top portion 70 and a bottom portion 72 (shown in FIG. 5).

Referring to FIGS. 1 and 9-15, the harness assembly 24 is utilized to allow the hunter 20 to carry the hunting tree stand 22. The harness assembly 24 includes a first upper strap 80, a second upper strap 82, an upper strap buckle 84, a bridging strap 86, a first lower strap buckle 88, a first lower strap 90, a second lower strap buckle 92, a second lower strap 94, a retention loop 96, a plurality of stitches 100, a plurality of stitches 102, a plurality of stitches 104, a plurality of stitches 106, a plurality of stitches 108, a plurality of stitches 110, and a plurality of stitches 112.

Figure 9:
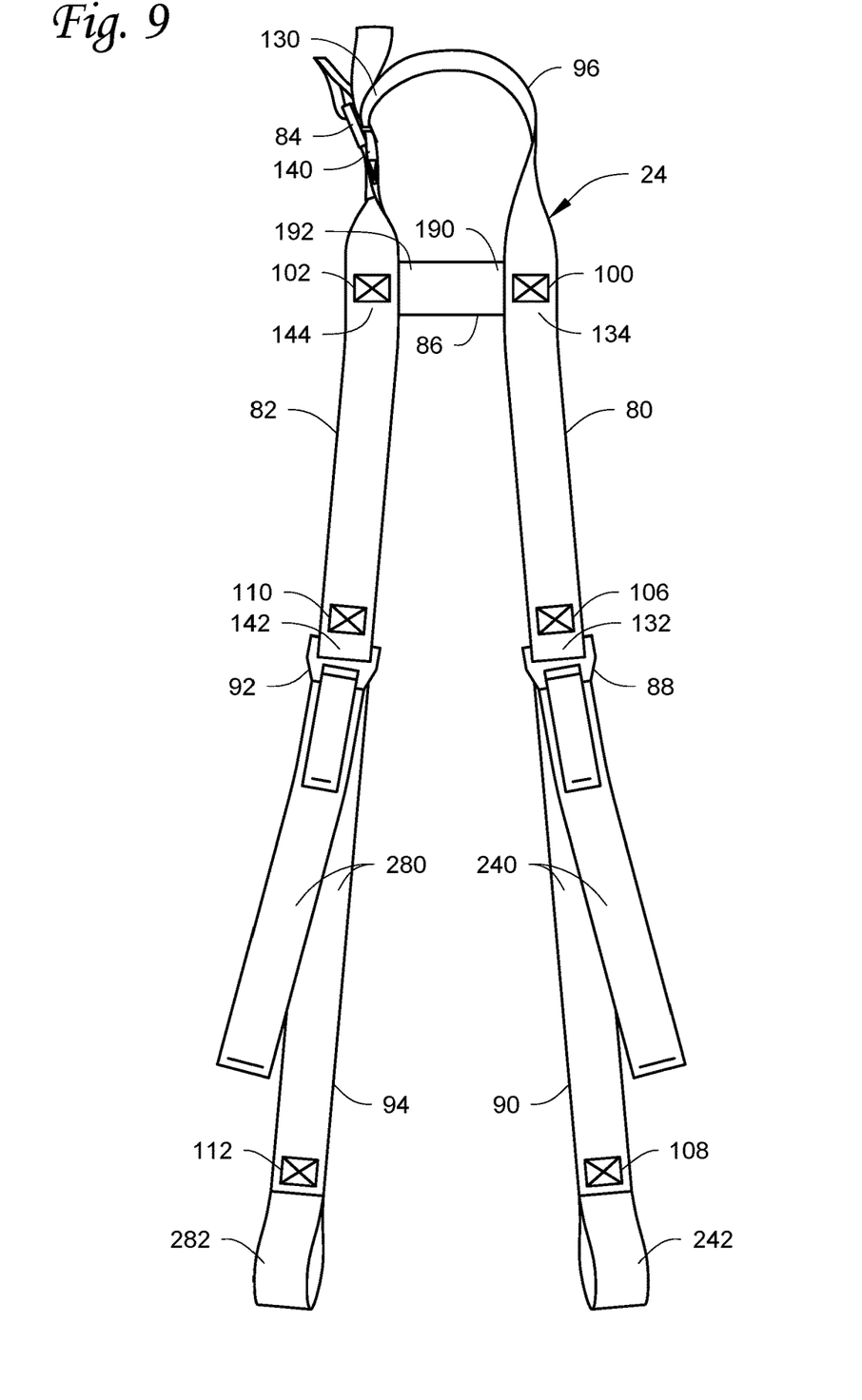
FIG. 9 is a schematic of the harness assembly of FIG. 1.
Figure 12:
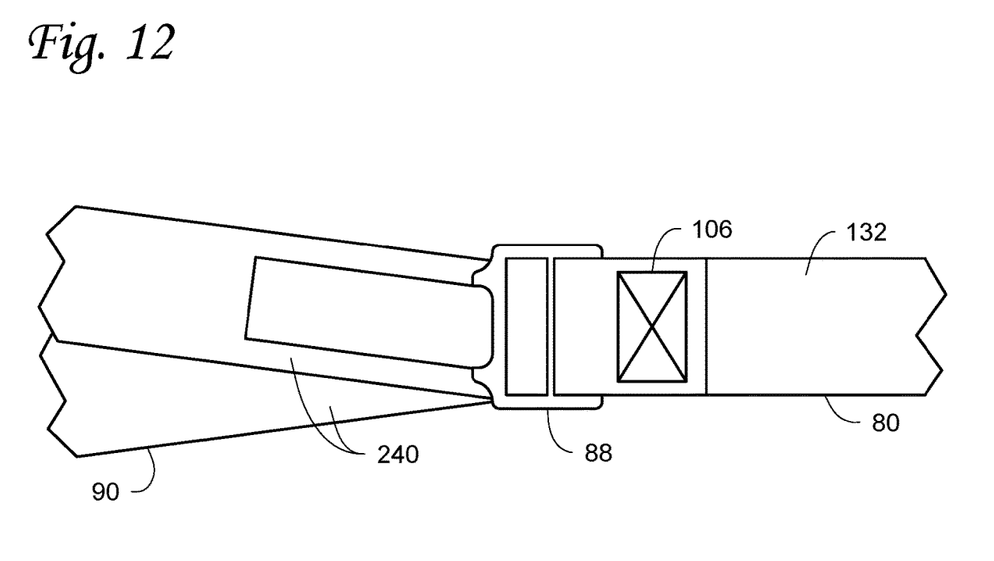
FIG. 12 is an enlarged view of a first upper strap, a first lower strap buckle, and a first lower strap utilized in the harness assembly of FIG. 9.

The first upper strap 80 has a first end portion 130, a second end portion 132, and an intermediate portion 134 disposed between the first and second end portions 130, 132 thereof.

Figure 13:
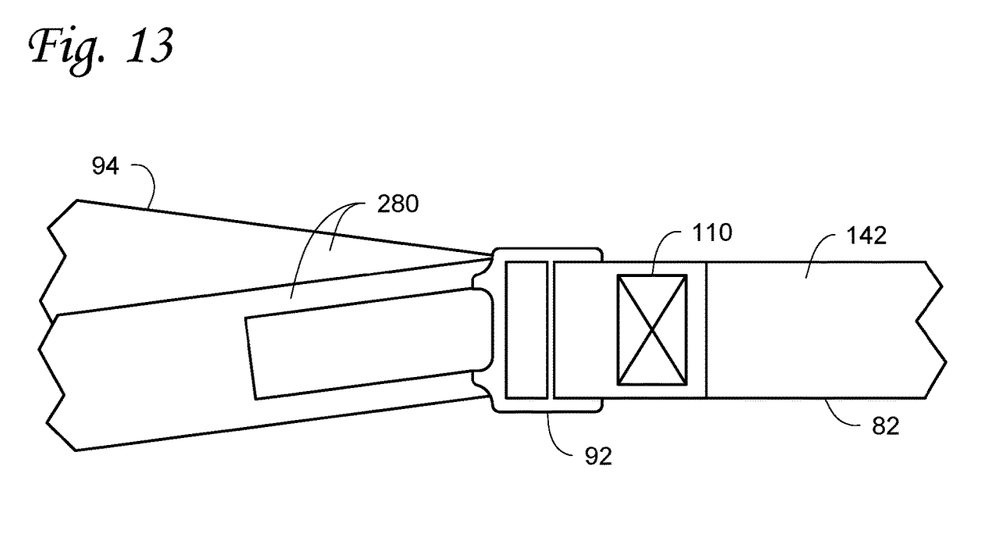
FIG. 13 is an enlarged view of a second upper strap, a second lower strap buckle, and a second lower strap utilized in the harness assembly of FIG. 9.
Figure 14:
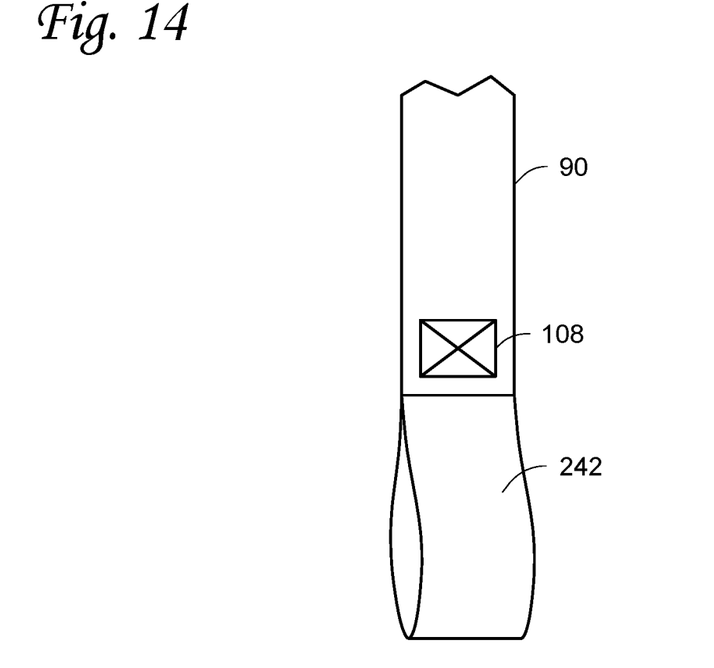
FIG. 14 is an enlarged view of a second end portion of a first lower strap utilized in the harness assembly of FIG. 9.

The second upper strap 82 has a first end portion 140, a second end portion 142, and an intermediate portion 144 disposed between the first and second end portions 140, 142 thereof.

Figure 11:
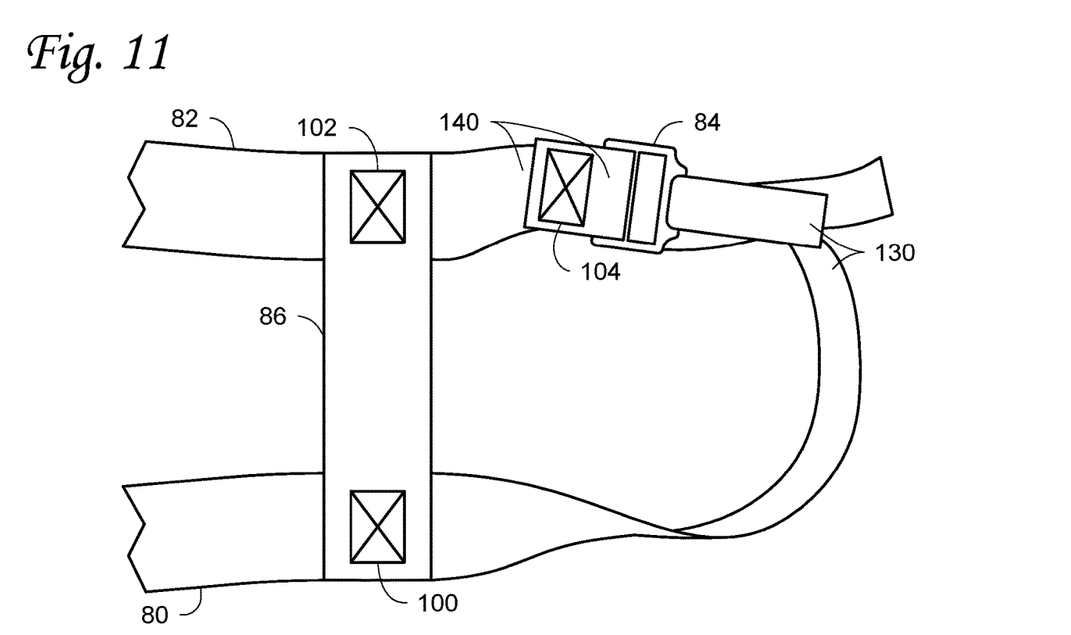
FIG. 11 is an enlarged schematic of a top portion of the harness assembly of FIG. 9.

The upper strap buckle 84 is coupled to the first end portion 130 of the first upper strap 80 and the first end portion 140 of the second upper strap 82.

The bridging strap 86 has a first end portion 190 and a second end portion 192. The first end portion 190 is coupled to the intermediate portion 134 of the first upper strap 80 utilizing the plurality of stitches 100. The bridging strap 86 is further coupled to the intermediate portion 144 of the second upper strap 82 utilizing the plurality of stitches 102. A retention loop 96 is formed by the bridging strap 86, the first end portion 130 of the first upper strap 80, the upper strap buckle 84, and the first end portion 140 of the second upper strap 82. The retention loop 96 has a sufficient length to encircle the ladder sections 62, 64 of the hunting tree stand 22 and to hold the ladder sections 62, 64 (shown in FIG. 4) against the platform 60 of the hunting tree stand 22.

The first lower strap buckle 88 is coupled to the second end portion 132 of the first upper strap 80. In particular, the second end portion 132 is disposed through a slot in the first lower strap buckle 88 and then the second end portion 132 is coupled to itself utilizing the plurality of stitches 106.

Figure 10:
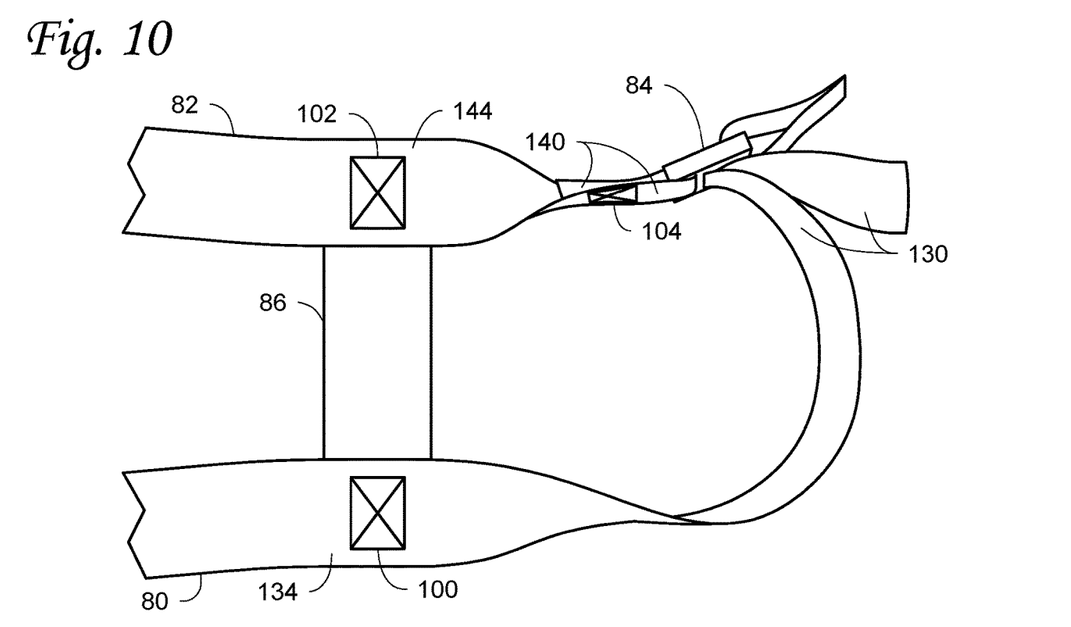
FIG. 10 is a schematic of a top portion of the harness assembly of FIG. 9.

Referring to FIGS. 9 and 10, the first lower strap 90 has a first end portion 240 and a second end portion 242. The first end portion 240 of the first lower strap 90 is coupled to the first lower strap buckle 88. In particular, the first end portion 240 is disposed through a slot in the first lower strap buckle 88. The second e11d portion. 242 of the first lower strap 90 is folded back onto itself and forms a loop portion thereof utilizing the plurality, of stitches 108.

The second lower strap buckle 92 is coupled to the second end portion 142 of the second upper strap 82. In particular, the second end portion 142 is disposed through a slot in the second lower strap buckle 92 and then the second end portion 142 is coupled to itself utilizing the plurality of stitches 110.

Figure 15:
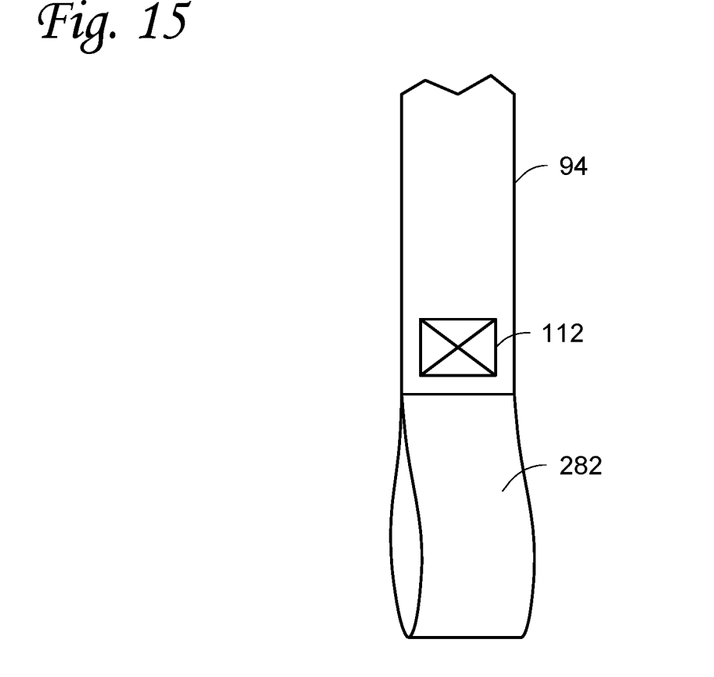
FIG. 15 is an enlarged view of a second end portion of a second lower strap utilized in the harness assembly of FIG. 9.

The second lower strap 94 has a first end portion 280 and a second end portion 282. The first end portion 280 of the second lower strap 94 is coupled to the second lower strap buckle 92. In particular, the first end portion 280 is disposed through a slot in the second lower strap buckle 92. The second end portion 282 of the second lower strap 94 is folded back onto itself and forms a loop portion thereof utilizing the plurality of stitches 112.

Figure 16:
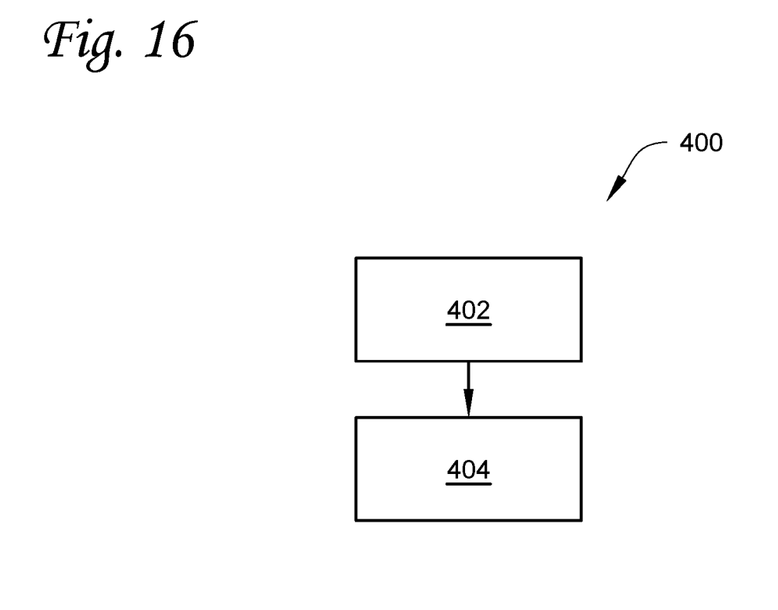
FIG. 16 is a block diagram of a method for using a harness assembly to carry a hunting tree stand 22 and other equipment for hunting.

Referring to FIG. 16, a method for using a harness assembly 24 to carry a hunting tree stand 22 and other equipment for hunting is shown at 400.

The method 400 begins at step 402, where a harness assembly 24 is provided, where the harness assembly 24 has first and second upper straps 80, 82, a bridging strap 86, an upper strap buckle 84, first and second lower straps 90, 94, and first and second lower strap buckles 88, 92. The first upper strap 80 has a first end portion 130, a second end portion 132, and an intermediate portion 134 disposed between the first and second end portions 130, 132 thereof. The second upper strap 82 has a first end portion 140, a second end portion 142, and an intermediate portion 144 disposed between the first and second end portions 140, 142 thereof. The upper strap buckle 84 is coupled to the first end portion 130 of the first upper strap 80 and the first end portion 140 of the second upper strap 82. The bridging strap 86 has a first end portion 190 and a second end portion 192. The first end portion 190 of the bridging strap 86 is coupled to the intermediate portion 134 of the first upper strap 80 and is further coupled to the intermediate portion 144 of the second upper strap 82 such that a retention loop 96 is formed by the bridging strap 86, the first end portion 130 of the first upper strap 80, the upper strap buckle 84, and the first end portion 140 of the second upper strap 82. The first lower strap buckle 88 is coupled to the second end portion 132 of the first upper strap 80. The first lower strap 90 has a first end portion 240 and a second end portion 242. The first end portion 240 of the first lower strap 90 is coupled to the first lower strap buckle 88. The second lower strap buckle 92 is coupled to the second end portion 142 of the second upper strap 82. The second lower strap 94 has a first end portion 280 and a second end portion 282. The first end portion 280 of the second lower strap 94 is coupled to the second lower strap buckle 92.

The hunter 20 then couples the retention loop 96 to both a top portion 70 of the hunting platform 60 and to at least one ladder section 62 of the hunting tree stand 22 that is disposed against the hunting platform 60 such that the at least one ladder section 62 is firmly held against a backside of the hunting platform 60.

At step 404, the hunter 20 couples the second end portion 242 of the first lower strap 90 to a bottom portion 72 (shown in FIG. 5) of the hunting platform 60.

The hunter 20 couples the second end portion 282 of the second lower strap 94 to the hunting platform 60.

The hunter 20 disposes the first and second upper straps 80, 82 against a chest 40 (shown in FIG. 1) of the hunter 20 while the first and second upper straps 80, 82 extend over first and second shoulders 42, respectively, of the hunter 20 and the first and second lower straps 90, 94 are disposed proximate to first and second gluteus medius muscles regions of the hunter 20, such that a front side of the hunting tree stand 22 is disposed against a back of the hunter 20, and the hunter 20 carries the hunting tree stand 22 using the harness assembly 24.

While the best modes for carrying out the many aspects of the present teachings have been described in detail, those familiar with the art to which these teachings relate will recognize various alternative aspects for practicing the present teachings that are within the scope of the appended claims.

What is claimed is:

1. A method for carrying a hunting tree stand, comprising:
providing a harness assembly having first and second upper straps, a bridging strap, upper strap buckles, first and second lower straps, and first and second lower strap buckles, wherein
the first upper strap having a first end portion, a second end portion, and an intermediate portion disposed between the first and second end portions thereof,
the second upper strap having a first end portion, a second end portion, and an intermediate portion disposed between the first and second end portions thereof,
the upper strap buckle being coupled to the first end portion of the first upper strap and the first end portion of the second upper strap,
the bridging strap having a first end portion and a second end portion, the first end portion of the bridging strap being coupled to the intermediate portion of the first upper strap and further coupled to the intermediate portion of the second upper strap such that a retention loop is formed by the bridging strap, the first end portion of the first upper strap, the upper strap buckle, and the first end portion of the second upper strap,
the first lower strap buckle being coupled to the second end portion of the first upper strap,
the first lower strap having a first end portion and a second end portion, the first end portion of the first lower strap being coupled to the first lower strap buckle,
the second lower strap buckle being coupled to the second end portion of the second upper strap, and
the second lower strap having a first end portion and a second end portion, the first end portion of the second lower strap being coupled to the second lower strap buckle;
coupling the retention loop to both a top portion of the hunting tree stand and to at least one ladder section for the hunting tree stand that is disposed against a hunting platform of the hunting tree stand such that the retention loop extends through the hunting platform, encircles the at least one ladder section of the hunting tree stand, and firmly holds the at least one ladder section against a back side of the hunting tree stand;

coupling the second end portion of the first lower strap to a bottom portion of the hunting platform;

coupling the second end portion of the second lower strap to the bottom portion of the hunting platform; and disposing the first and second upper straps against a chest of a user while the first and second upper straps extend over first and second shoulders, respectively, of the user and the first and second lower straps are disposed proximate to first and second gluteus medius muscle regions, respectively, of the user such that a front side of the hunting tree stand is disposed against a back of the user and the user carries the hunting tree stand using the harness assembly.

2. The method of claim 1, wherein the hunting platform includes the back side of the hunting tree stand, the retention loop firmly holds the at least one ladder section against the back side of the hunting platform of the hunting tree stand.

3. The method of claim 1, wherein the at least one ladder section is a separate component from the hunting platform.

4. The method of claim 1, wherein the retention loop horizontally encircles the at least one ladder section of the hunting tree stand, and the at least one ladder section has a length extending along a vertical direction.

* * * * *